(12) United States Patent
Sun

(10) Patent No.: US 11,438,765 B2
(45) Date of Patent: Sep. 6, 2022

(54) METHODS AND APPARATUSES FOR COMMUNICATION OF PRIVACY SETTINGS

(71) Applicant: Sheng Sun, Ottawa (CA)

(72) Inventor: Sheng Sun, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/930,992

(22) Filed: Jul. 16, 2020

(65) Prior Publication Data

US 2022/0022042 A1  Jan. 20, 2022

(51) Int. Cl.
| | |
|---|---|
| H04W 12/08 | (2021.01) |
| H04W 12/086 | (2021.01) |
| H04W 12/10 | (2021.01) |
| H04L 9/40 | (2022.01) |
| H04W 12/37 | (2021.01) |

(52) U.S. Cl.
CPC .......... *H04W 12/086* (2021.01); *H04L 63/20* (2013.01); *H04W 12/10* (2013.01); *H04W 12/37* (2021.01)

(58) Field of Classification Search
CPC ... H04W 12/086; H04W 12/37; H04W 12/10; H04W 12/08; H04L 63/20
See application file for complete search history.

(56) References Cited

U.S. PATENT DOCUMENTS

| | | | | |
|---|---|---|---|---|
| 2008/0201751 | A1* | 8/2008 | Ahmed ............ | H04N 21/43615 725/109 |
| 2009/0286512 | A1* | 11/2009 | Huber ................. | H04L 41/0803 455/411 |
| 2010/0281364 | A1* | 11/2010 | Sidman ................... | G06Q 30/02 715/713 |
| 2012/0173869 | A1* | 7/2012 | Stinson, III ............. | H04L 69/22 713/153 |
| 2014/0050320 | A1* | 2/2014 | Choyi ................... | H04W 12/06 380/270 |
| 2014/0254454 | A1 | 9/2014 | Calcev et al. | |
| 2017/0374034 | A1* | 12/2017 | Zuniga ................. | H04W 12/08 |
| 2019/0005004 | A1* | 1/2019 | Lane ..................... | G06Q 10/103 |
| 2020/0204996 | A1* | 6/2020 | Longobardi ........ | H04W 12/062 |

FOREIGN PATENT DOCUMENTS

CN  105282825 A  1/2016

OTHER PUBLICATIONS

S2-131553, Secretary of SA WG2, Draft Report of SA WG2 meetings #96, SA WG2 Meeting #S2-97, May 27-31, 2013, Busan, South Korea, total 80 pages.

* cited by examiner

*Primary Examiner* — Abu S Sholeman

(57) ABSTRACT

Methods and apparatuses are described to enable an access point to communicate privacy settings and disclaimer to an electronic device. An AP transmits an indication that the AP supports communication of privacy settings and privacy disclaimer. The AP receives, from an electronic device, a request for information about the privacy settings and privacy disclaimer associated with the AP. The AP transmits, to a network server such as an ANQP server, a query request for information about the privacy settings and privacy disclaimer associated with the AP. The AP receives, from the network server, a query response including information about the privacy settings and privacy disclaimer associated with the AP. The AP transmits, to the device, a response including information about the privacy settings and privacy disclaimer associated with the AP.

21 Claims, 8 Drawing Sheets

METHODS AND APPARATUSES FOR COMMUNICATION OF PRIVACY SETTINGS

FIELD

The present disclosure relates generally to wireless communications. In various examples, the present disclosure is related to methods and apparatuses for communication of privacy settings, examples of which may be implemented under IEEE 802.11.

BACKGROUND

Data privacy and protection is increasingly of concern in wireless communications. Some jurisdictions have enacted regulations to ensure data privacy is respected. For example, under the General Data Protection Regulation (GDPR), organizations are required to provide end users with a privacy notice that is: in a concise, transparent, intelligible, and easily accessible form; written in clear and plain language, particularly for any information addressed specifically to a child; delivered in a timely manner; and provided free of charge. The GDPR also stipulates what information an organization must share in a privacy notice. Other similar regulations governing data privacy have or are expected to be enacted in other jurisdictions.

It is important that the wireless communications technology is designed to also support data privacy, in order to enable compliance with data privacy regulations.

SUMMARY

In various examples disclosed herein, solutions are provided that enable communication of privacy settings, based on the Access Network Query Protocol (ANQP). The present disclosure describes examples based on the existing ANQP, which may be more easily implemented in existing systems and apparatuses. In some examples, by modifying communications defined in the ANQP, the Generic Advertisement Service (GAS) query is used as a vehicle to communicate privacy settings and privacy disclaimers to an electronic device. In some examples, the electronic device may use the GAS comeback request as a vehicle to communicate a consent to the privacy settings and privacy disclaimers.

In some example aspects, the present disclosure describes a method at an access point (AP). The method includes: transmitting an indication that the AP supports communication of privacy settings and privacy disclaimer associated with the AP; receiving, from an electronic device (ED), a request for information about the privacy settings and privacy disclaimer associated with the AP; transmitting, to a network server, a query request for information about the privacy settings and privacy disclaimer associated with the AP; receiving, from the network server, a query response including information about the privacy settings and privacy disclaimer associated with the AP; and transmitting, to the ED, a response including information about the privacy settings and privacy disclaimer associated with the AP.

In any of the examples, the method may include: receiving, from the ED, a probe request frame. The indication that the AP supports communication of privacy settings and privacy disclaimer associated with the AP may be transmitted in a probe response frame.

In any of the examples, the indication that the AP supports communication of privacy settings and privacy disclaimer associated with the AP may be transmitted in a broadcast beacon frame.

In any of the examples, the indication that the AP supports communication of privacy settings and privacy disclaimer associated with the AP may be transmitted in a frame having a frame body, the frame body including a privacy settings information element (IE). The privacy settings IE may have a bit value that is set to indicate support of communication of privacy settings and privacy disclaimer.

In any of the examples, the request for information may be received from the ED in a generic advertisement service (GAS) request frame, and the response may be transmitted to the ED is in a GAS response frame.

In any of the examples, the query response may be transmitted to the network server in an access network query protocol (ANQP) query request frame, and the query response received from the network server may be in an ANQP query response frame.

In any of the examples, the ANQP query response frame may include, in a frame body of the ANQP query response frame, a privacy disclaimer and settings information element (IE). The privacy disclaimer and settings IE may include a privacy disclaimer field containing information about the privacy disclaimer associated with the AP, and a privacy settings field containing information about the privacy settings associated with the AP. The GAS response frame may include, in a frame body of the GAS response frame, the privacy disclaimer and settings IE.

In any of the examples, the method may include: receiving, from the ED, an indication that the ED consents to the privacy settings and privacy disclaimer associated with the AP.

In any of the examples, the indication may be received from the ED in a generic advertisement service (GAS) comeback request frame. The GAS comeback request frame may include a privacy acknowledgement field, and the AP may be configured to detect the privacy acknowledgement field as the indication that the ED consents.

In any of the examples, the indication may be received from the ED in an association request frame. The association request frame may include a privacy acknowledgement field, and the AP may be configured to detect the privacy acknowledgement field as the indication that the ED consents.

In any of the examples, the method may include: transmitting, to the ED, an indication of receipt of the consent.

In some example aspects, the present disclosure describes an access point (AP) including: a processing unit coupled to a memory, the memory storing instructions that, when executed by the processing unit, cause the AP to perform any of the methods described herein.

In some example aspects, the present disclosure describes a method at an electronic device (ED). The method includes: receiving, from an access point (AP), an indication that the AP supports communication of privacy settings and privacy disclaimer associated with the AP; transmitting, to the AP, a request for information about the privacy settings and privacy disclaimer associated with the AP; and receiving, from the AP, a response including information about the privacy settings and privacy disclaimer associated with the AP.

In any of the examples, the indication that the AP supports communication of privacy settings and privacy disclaimer associated with the AP may be received in a frame having a frame body. The frame body may include a privacy settings information element (IE). The privacy settings IE may have a bit value that is set to indicate support of communication of privacy settings and privacy disclaimer.

In any of the examples, the request for information may be transmitted to the AP in a generic advertisement service (GAS) request frame, and the response received from the AP may be in a GAS response frame.

In any of the examples, the GAS response frame may include, in a frame body of the GAS response frame, a privacy disclaimer and settings information element (IE). The privacy disclaimer and settings IE may include a privacy disclaimer field containing information about the privacy disclaimer associated with the AP, and a privacy settings field containing information about the privacy settings associated with the AP.

In any of the examples, the method may include: transmitting, to the AP, an indication that the ED consents to the privacy settings and privacy disclaimer associated with the AP.

In any of the examples, the indication may be transmitted to the AP in a generic advertisement service (GAS) comeback request frame. The GAS comeback request frame may include a privacy acknowledgement field, the privacy acknowledgement field being detectable as the indication that the ED consents.

In any of the examples, the indication may be transmitted to the AP in an association request frame. The association request frame may include a privacy acknowledgement field, the privacy acknowledgement field being detectable as the indication that the ED consents.

In some example aspects, the present disclosure describes an electronic device (ED) including: a processing unit coupled to a memory, the memory storing instructions that, when executed by the processing unit, cause the ED to perform any of the methods described herein.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Compliance with privacy requirements is an ongoing concern. Many privacy regulations have been enacted with respect to data privacy. In the present disclosure, data privacy is defined as ensuring that collection, storage and usage of a user's data is in accordance with the user's knowledge and consent. Many solutions that have been designed, in compliance with IEEE 802.11 standards, are concerned with data protection, which may be defined as how to prevent unauthorized access to a user's data. However, there is also a need to provide a technical solution that enables requesting and receiving user consent for authorizing access to the user's data.

Figure 1:
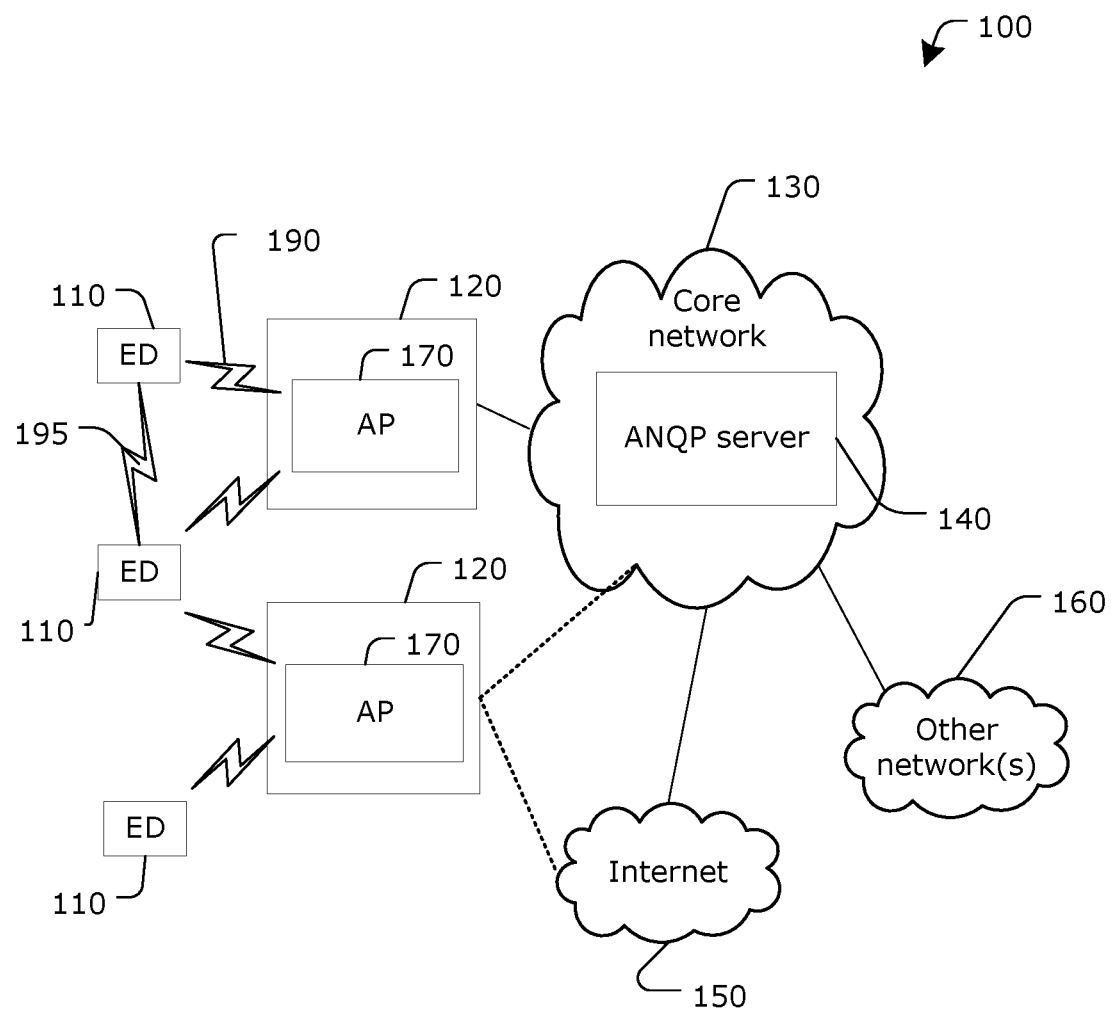
FIG. 1 is a schematic diagram of an example communication system suitable for implementing examples described herein.
Figure 2:
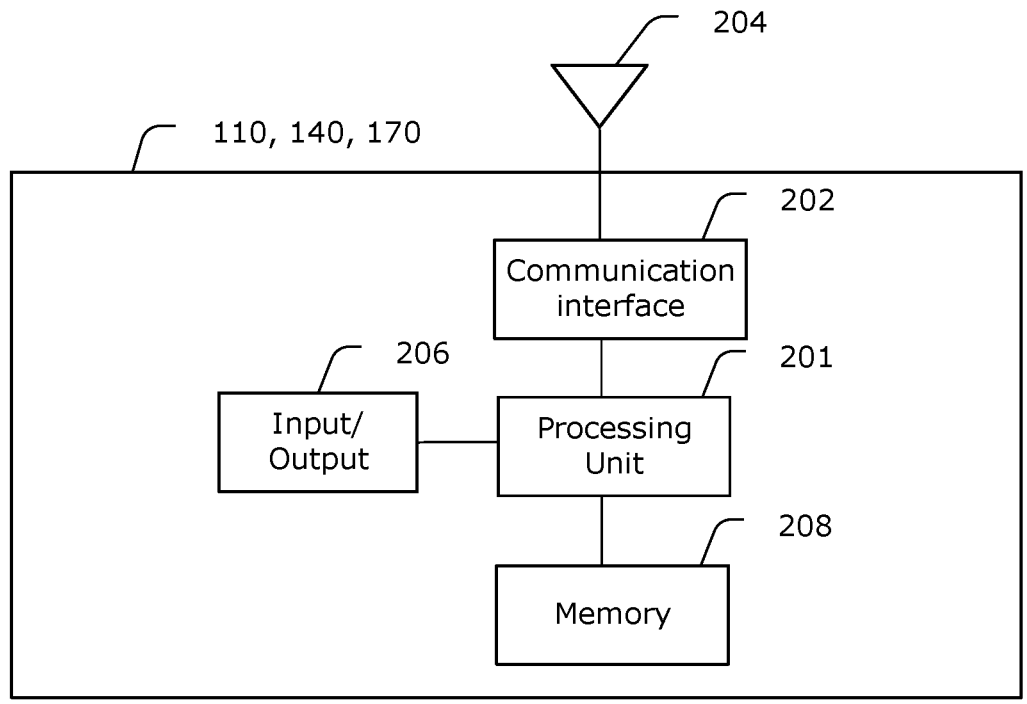
FIGS. 2 and 3 are block diagrams showing example apparatuses that may be suitable for implementing examples described herein.
Figure 3:
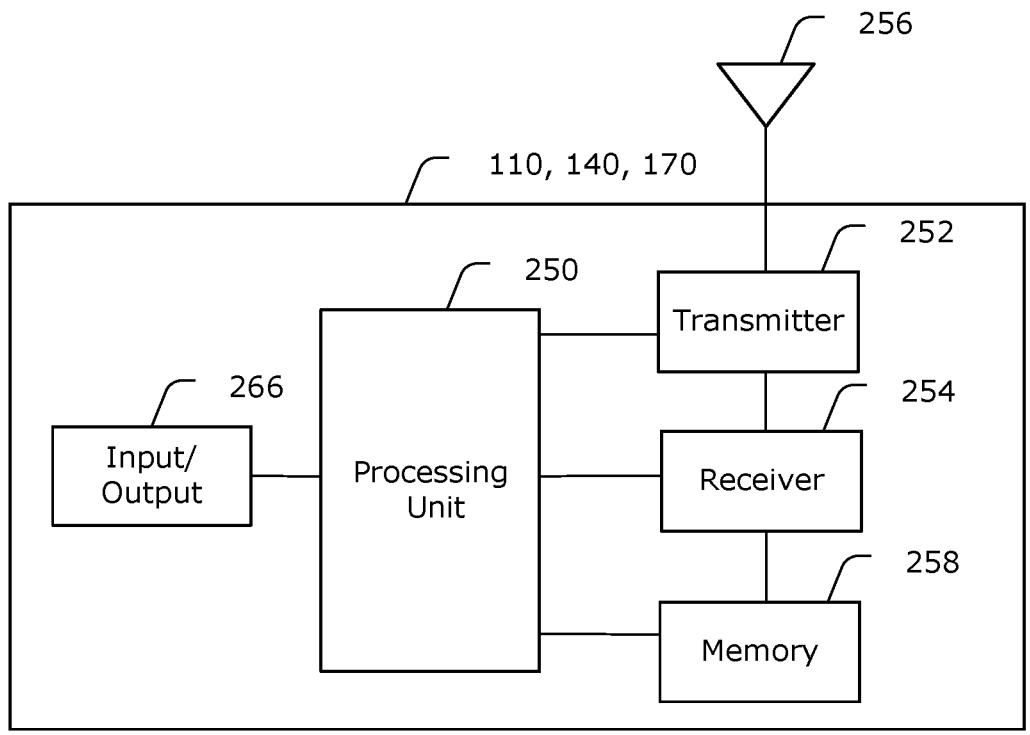

The present disclosure provides examples that address one or more of the challenges described above. To assist in understanding the present disclosure, FIGS. 1-3 are first described. FIGS. 1-3 provide examples of the network, system and apparatuses that may be used to implement examples described in the present disclosure.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated wirelessly (e.g., via broadcast, narrowcast, user device to user device, etc.) among entities of the system 100, for example using Wi-Fi communications. The wireless system 100 may operate by sharing resources such as bandwidth. The wireless system 100 may be suitable for wireless communications, using 5G technology and/or later generation wireless technology. In some examples, the wireless system 100 may also accommodate some legacy wireless technology (e.g., 3G or 4G wireless technology).

In the example shown, the wireless system 100 includes EDs 110, local area networks (LANs) 120, a core network 130, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 may be configured to transmit, receive, or both via wireless or wired communication channels. Each ED 110 represents any suitable end user device for wireless operation and may include such devices (or may be referred to) as a user equipment (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, an Internet of things (IoT) device, or a consumer electronics device, among other possibilities. Future generation EDs 110 may be referred to using other terms.

In FIG. 1, the LANs 120 include access points (APs) 170. Although FIG. 1 shows each LAN 120 including a single respective AP 170, it should be understood that any given LAN 120 may include more than one AP 170, and any given LAN 120 may also include other controllers, relay nodes, elements, and/or devices. Each AP 170 is configured to wirelessly interface with one or more of the EDs 110 to enable access to any other AP 170, the core network 130, the Internet 150, and/or the other networks 160. In some examples, instead of a LAN 120, the AP 170 may be part of a personal area network (PAN), regional access network (RAN), or wide area network (WAN), among other possibilities. There may be a variety of different local/regional/wide area networks (generally represented by LANs 120 in the example of FIG. 1) in the system 100, with access provided by different types of APs 170. For example, depending on context, the APs 170 may also be referred to as (or may include) a base transceiver station (BTS), a radio base station, a Node-B (NodeB), an evolved NodeB (eNodeB or eNB), a Home eNodeB, a gNodeB (gNB) (sometimes called a next-generation Node B), a transmission point (TP), a transmission/reception point (TRP), a site controller, a base station (BS), or a wireless router, among other possibilities. In some examples, the LAN 120 may be a Next Generation (NG) network, and the AP 170 may be referred to as a NG-RAN node. In such cases, the AP 170 may be a gNB or a NG-eNB (which is an eNB that is connected to the NG core network via a NG interface). Future generation APs 170 may be referred to using other terms. Any ED 110 may be alternatively or additionally configured to interface, access, or communicate directly with any other AP 170, the Internet 150, the core network 130, the other networks 160, or any combination of the preceding. In some examples, an AP 170 may access the core network 130 via the Internet 150.

The EDs 110 and APs 170 are examples of communication equipment that can be used to implement some or all of the functionality and/or embodiments described herein. Any AP 170 may be a single element, as shown, or multiple elements, distributed in the corresponding LAN 120, or otherwise. Each AP 170 transmits and/or receives wireless signals within a particular geographic region or area, sometimes referred to as a "cell" or "coverage area". A cell may be further divided into cell sectors, and a AP 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of LANs 120 shown is exemplary only. Any number of LANs 120 may be contemplated when devising the wireless system 100.

The APs 170 communicate with one or more of the EDs 110 over one or more Uu wireless interfaces 190 (e.g., via radio frequency (RF), microwave, infrared (IR), etc.). The Uu interface 190 may also be referred to as a Uu link, Uu connection, ED-AP link/connection/interface, or ED-network link/connection/interface, for example. The EDs 110 may also communicate directly with one another (i.e., without involving the AP 170) via one or more sidelink (SL) wireless interfaces 195. The SL interface may also be referred to as a SL connection, ED-ED link/connection/interface, device-to-device (D2D) link/connection/interface, or simply as SL, for example. The wireless interfaces 190, 195 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) for wireless communications.

The LANs 120 are in communication with the core network 130 to provide the EDs 110 with various services such as voice, data, and other services. The LANs 120 and/or the core network 130 may be in direct or indirect communication with one or more other LANs (not shown), which may or may not be directly served by core network 130, and may or may not employ the same radio access technology. The core network 130 may also serve as a gateway access between (i) the LANs 120 or EDs 110 or both, and (ii) other networks (such as the internet 150, and the other networks 160). The core network 130 may also provide services.

In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. The internet 150 may include a network of computers and subnets (intranets) or both, and incorporate protocols, such as Internet Protocol (IP), Transmission Control Protocol (TCP), User Datagram Protocol (UDP). The EDs 110 may be multimode devices capable of operation according to multiple radio access technologies, and incorporate multiple transceivers necessary to support such.

In the example of FIG. 1 an access network query protocol (ANQP) server 140 is implemented in the core network 130 (e.g., at a backend server, or at a dedicated location management unit). ANQP is a query and response protocol that enables an ED 110 to request (and receive in response) information about services available at a given LAN 120 (typically by querying the AP 170 at that LAN 120). Some operations that involve the ANQP server 140 are defined under the IEEE 802.11u standard. The ANQP server 140 may perform operations (e.g., as discussed herein) to enable an ED 110 to be informed of privacy settings at a given LAN 120, for example.

In some examples, the ANQP server 140 may be implemented outside of the core network 130, for example at an AP 170 of the LAN 120. Although described as a singular ANQP server 140, in some examples the ANQP server 140 may be implemented in a distributed manner (e.g., being a virtual machine distributed over two or more physical servers). In the present disclosure, reference may be made to the ANQP server 140 in the core network 130 for simplicity, however it should be understood that the ANQP server 140 may be implemented in various different ways.

FIGS. 2 and 3 illustrate example apparatuses that may implement the methods and teachings according to this disclosure. FIGS. 2 and 3 illustrates different possible embodiments for the ED 110, AP 170 and/or ANQP server 140, and are not intended to be limiting.

As shown in FIG. 2, an example apparatus (e.g., an example embodiment of the ED 110, AP 170, or ANQP server 140) includes at least one processing unit 201. The processing unit 201 implements various processing operations of the apparatus. For example, the processing unit 201 could perform signal coding, data processing, power control, input/output processing, or any other functionality of the apparatus. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The apparatus (e.g., the ED 110, AP 170, or ANQP server 140) also includes at least one communication interface 202 for wired and/or wireless communications. Each communication interface 202 includes any suitable structure for generating signals for wireless or wired transmission and/or processing signals received wirelessly or by wire. The apparatus in this example includes at least one antenna 204 (in other examples, the antenna 204 may be omitted). Each antenna 204 includes any suitable structure for transmitting and/or receiving wireless or wired signals. One or multiple communication interfaces 202 could be used in the apparatus. One or multiple antennas 204 could be used in the apparatus. In some examples, one or more antennas 204 may be an antenna array 204, which may be used to perform beamforming and beam steering operations. Although shown as a single functional unit, the apparatus could also be implemented using at least one transmitter interface and at least one separate receiver interface.

The apparatus (e.g., the ED 110, AP 170, or ANQP server 140) further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the apparatus (e.g., the ED 110, AP 170, or ANQP server 140) includes at least one memory 208. The memory 208 stores instructions and data used, generated, or collected by the apparatus. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, another example apparatus (e.g., another example embodiment of the ED 110, AP 170, or ANQP server 140) includes at least one processing unit 250, at least one transmitter 252, at least one receiver 254, one or more antennas 256, at least one memory 258, and one or more input/output devices or interfaces 266. The processing unit 250 implements various processing operations of the apparatus, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2. The memory 258 stores instructions and data used, generated, or collected by the apparatus. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

As previously mentioned, privacy regulations require that an operator communicate its privacy settings to a user's device. In particular, at the time that an ED 110 connects to a LAN 120 (via an AP 170 within the LAN 120), the privacy settings at the LAN 120 should be communicated to the ED 110, particularly where the privacy settings relate to use of the user's data for a commercial purpose. For example, the LAN 120 may collect information (e.g., information about the geographical location of the ED 110, information about the user's online activity, information about the user's identity and interests, etc.) stored on or generated by the ED 110 during the time that the ED 110 is connected to the LAN 120. Such information may be collected for commercial use, for example, which may be strictly regulated. It may be necessary for user provide consent, via the ED 110, to collection of the user's data, before the connection to the LAN 120 can be established.

The present disclosure describes examples that enable the AP 170 of the LAN 120 to announce the privacy settings of the LAN 120 to the ED 110, using ANQP frames. It should be understood that the privacy settings of the LAN 120 are also the privacy settings of the AP 170. ANQP is a protocol that enables the AP 170 to deliver information about network services at the LAN 120 (provided via the AP 170) to an ED 110 that enters the coverage area of the AP 170. Information about the network services available to the ED 110 via the AP 170 is stored at the ANQP server 140. In the present disclosure, information about the privacy disclaimer and privacy settings at the AP 170 is also stored at the ANQP server 140. ANQP involves the use of beacon frames, Generic Advertisement Service (GAS) request/response frames and ANQP query/response frames to request and deliver information between the ANQP server 140, the AP 170 and the ED 110. In particular, in the present disclosure, ANQP enables information about network services, privacy disclaim and privacy settings to be communicated between the ANQP server 140, the AP 170 and the ED 110.

The privacy settings are communicated in a format that is able to be decoded by the ED 110. The privacy settings include information about what data is being collected, how the data is stored and/or how the data is used. The privacy settings may be represented by textual information, flags (e.g., binary bits that are set to indicate applicable or non-applicable privacy settings), index values (e.g., index values that reference a table of privacy settings, which may be predefined such as in a standard), or other suitable formats (e.g., ANQP messages may support encoding information in Unicode, or ASCII formats). The ED 110 may then explicitly communicate a consent (which may be indicated by user input to the ED 110) back to the AP 170, or the consent may be provided implicitly (e.g., by the ED 110 continuing the association request with the AP 170). The AP 170 may communicate a privacy disclaimer as well as privacy settings to the ED 110. The privacy disclaimer is a notification to the ED 110 that data will be collected, and may include textual information. The privacy disclaimer may indicate that the data is being collected, stored and/or shared in compliance with a privacy regulation, for example.

Figure 4A:
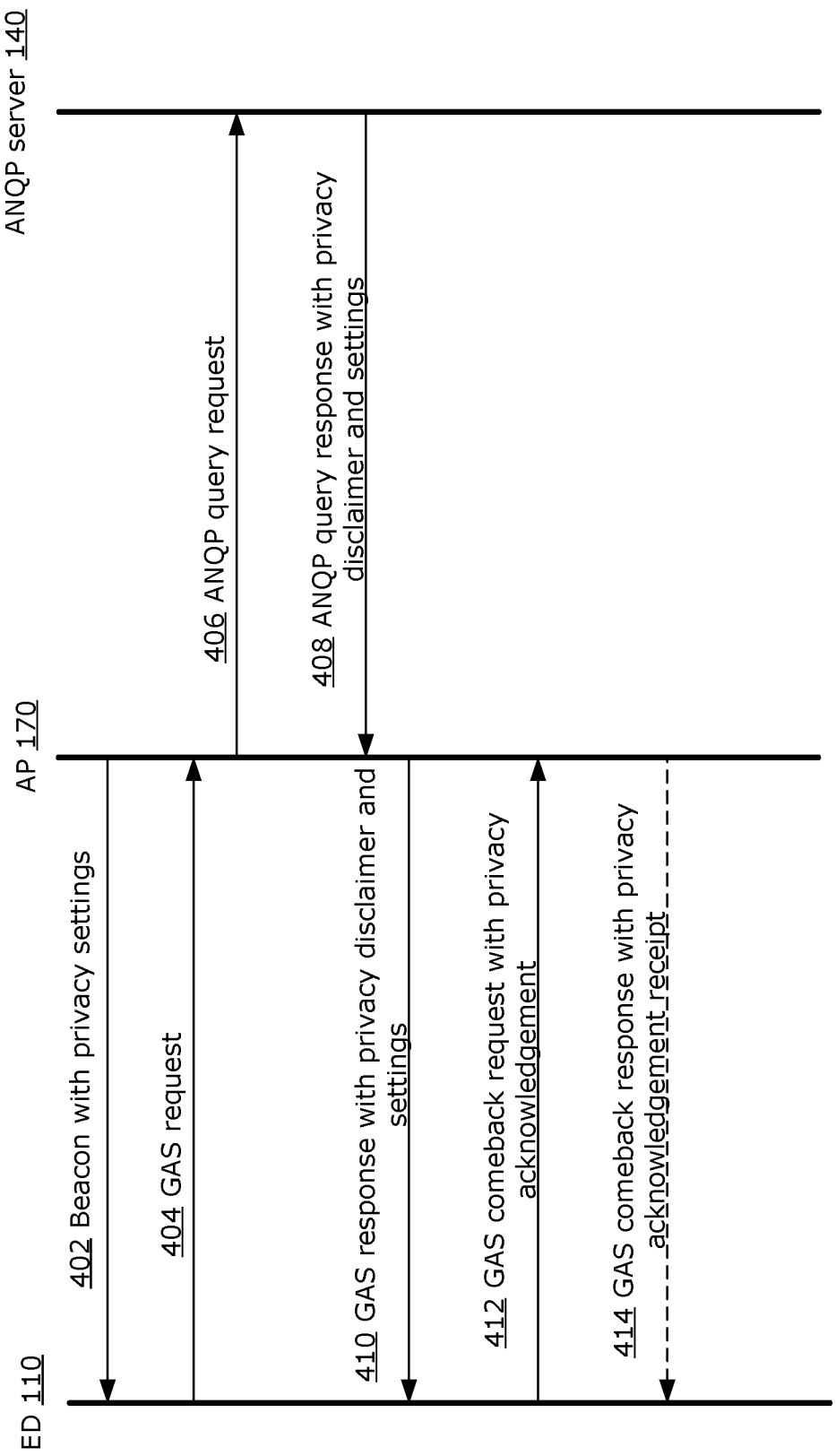
FIGS. 4A are 4B are signaling diagrams illustrating example signaling between an electronic device (ED), an access point (AP) and an ANQP server for implementing examples described herein.

FIG. 4A is an example signal flow diagram illustrating signaling between network entities, which may be used to implement some of the examples described herein. FIG. 4A shows signaling performed by the ED 110, the AP 170, and the ANQP server 140. The ANQP server 140 may, in some examples, be instead any other network server storing information associated with the AP's network. For example, the ANQP server 140 may be any suitable server or network entity belonging to the core network 130. In some examples, one or more of the signals shown may be communicated via one or more relay nodes. The following discussion focuses on details relevant to communication of privacy settings. However, the signaling shown in FIG. 4A may also be used to communicate other information that is regularly communicated using ANQP (e.g., information about network services).

The signaling illustrated in FIG. 4A may begin when the ED 110 first enters the coverage area of the AP 170. For example, the AP 170 may, at 402, broadcast a beacon frame to announce its network information. The beacon frame is received by the ED 110 when the ED 110 enters the coverage area of the AP 170. In other examples, instead of a beacon frame that is unilaterally transmitted by the AP 170, the AP 170 may transmit a probe response frame to the ED 110 in response to a probe request frame (not shown) that is sent by the ED 110 when the ED 110 enters the new coverage area. The beacon frame (or probe response frame) includes an indication to the ED 110 that the AP 170 has a privacy settings capability. In the present disclosure, the privacy settings capability means that the AP 170 is configured to support communication of the AP's privacy settings and disclaimer. In particular, the privacy settings capability indicates that the AP 170 supports communication of privacy settings and disclaimer in accordance with the examples described herein (e.g., via ANQP-based communications).

Figure 5:
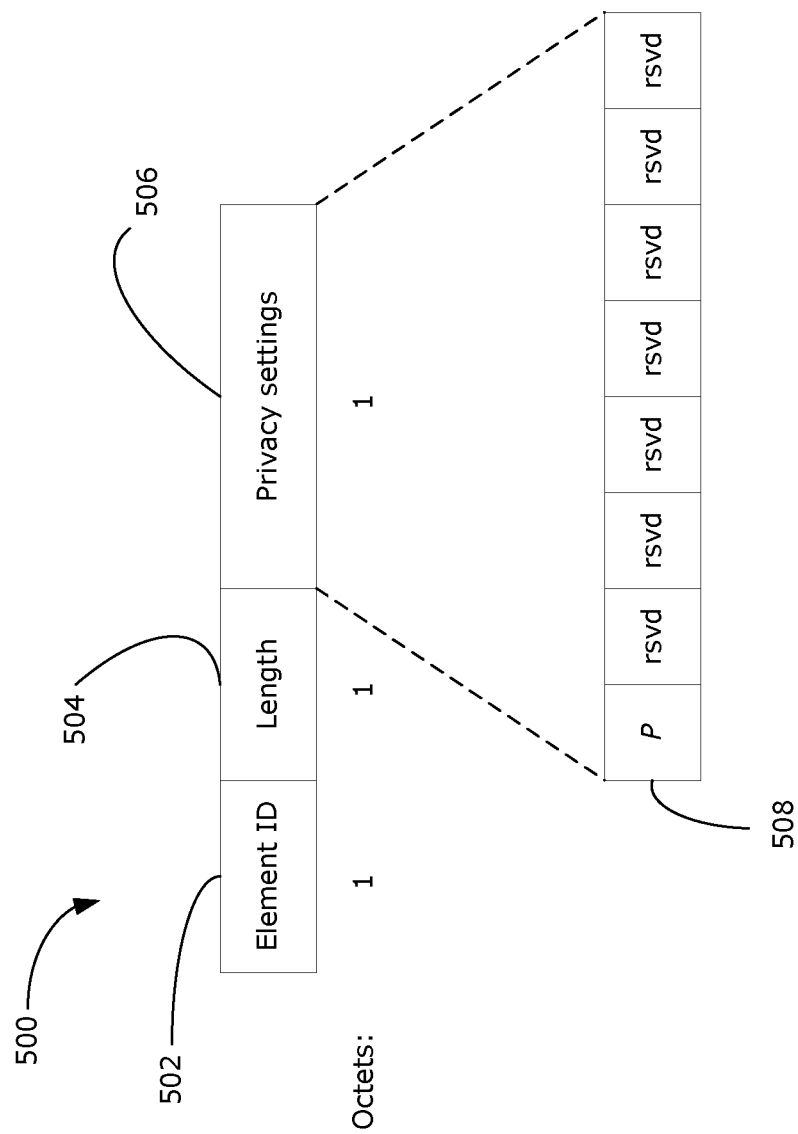
FIG. 5 illustrates an example privacy settings information element (IE) that may be used in the examples of FIGS. 4A and 4B.

For example, the beacon frame (or probe response frame) may contain a privacy settings information element (IE) in the frame body. The privacy settings IE may have a bit value that is set to indicate whether or not the AP 170 has a privacy settings capability. For example, the privacy settings IE may include a binary bit that is set to indicate whether or not the AP 170 has a privacy settings capability. The ED 110 may be configured beforehand (e.g., according to a standard) to recognize the privacy settings IE and to perform signaling (as described below) to obtain information about the privacy settings and disclaimer from the AP 170. An example format of the privacy settings IE that is included in the beacon frame (or probe response frame) sent at 402 is shown in FIG. 5, which is described in further detail below.

At 404, the ED 110 transmits a GAS request frame to the AP 170, to request information about the privacy settings (and possibly other network information, such as accessible network services) at the AP 170. After receiving the GAS request frame, the AP 170 at 406 transmits an ANQP query request frame to the ANQP server 140, to request the ANQP server 140 to provide information about the privacy disclaimer and settings (and possibly other information about network services) at the AP 170. The GAS request frame and the ANQP query request frame may be in accordance with the frame formats defined by the IEEE 802.11u standard.

Figure 6:
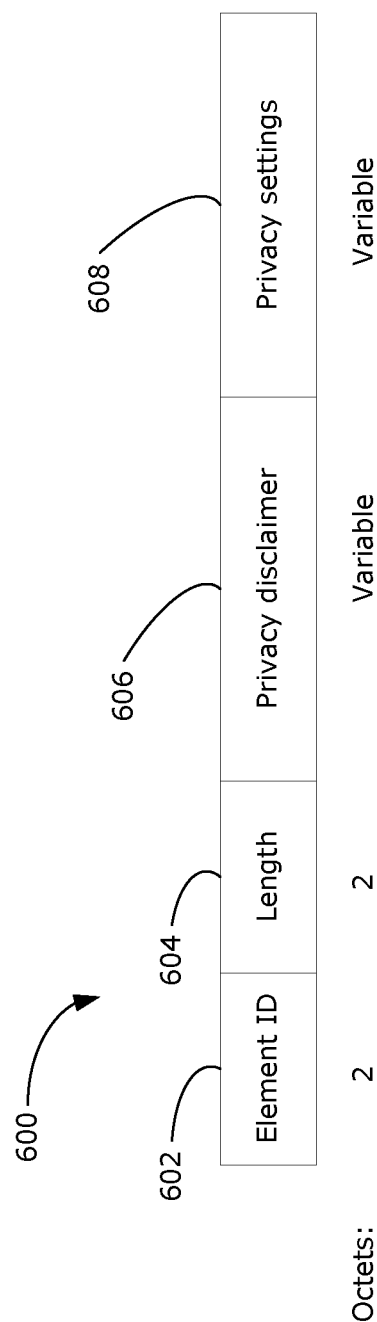
FIG. 6 illustrates an example privacy settings and disclaimer IE that may be used in the examples of FIGS. 4A and 4B.

At 408, in response to the ANQP query request frame, the ANQP server 140 transmits an ANQP query response frame back to the AP 170, to provide information about the AP's privacy disclaimer and settings (and possibly other information about network services). The ANQP query response frame contains a privacy disclaimer and settings IE in the frame body. The privacy disclaimer and settings IE provides information about the privacy settings and the privacy disclaimer that is applicable to the AP 170. For example, after receiving the ANQP query request from the AP 170, the ANQP server 140 may retrieve privacy information stored at the ANQP server 140 that is associated with the AP 170 (e.g., by identifying the AP 170 using information contained in the ANQP query request and retrieving the information associated with the identified AP 170 from a memory of the ANQP server 140). The privacy disclaimer and settings IE provides information about the privacy disclaimer and the privacy settings associated with the AP 170. The privacy disclaimer and settings IE may include the actual privacy disclaimer and privacy settings associated with the AP 170 (e.g., the actual text of the privacy disclaimer. An example format of the privacy disclaimer and settings IE that is included in the ANQP query response frame is shown in FIG. 6, which is described in further detail below.

At 410, after receiving the ANQP query response frame, the AP 170 reframes the ANQP response frame (including the privacy disclaimer and settings IE) into a GAS response frame. The AP 170 transmits the GAS response frame back to the ED 110 to provide information about the privacy disclaimer and settings (and possibly information about other network services). The AP 170 may multicast the GAS response frame to multiple EDs 110, for example using a group address to address the GAS response frame.

After transmitting the GAS response frame to the ED 110, the AP 170 may wait for a response from the ED 110 indicating consent to the privacy disclaimer and settings. The AP 170 may wait for a predefined waiting time duration (e.g., the time duration defined for the GAS comeback delay, in accordance with standards). If the ED 110 does not respond before expiry of the time duration, the AP 170 may consider this as an indication that the ED 110 does not consent to the privacy disclaimer and settings, and the AP 170 may not accept any association requests from the ED 110.

After 410, the ED 110 has been provided with information about the privacy disclaimer and privacy settings associated with the AP 170. The ED 110 may perform operations to inform the user about the privacy disclaimer and privacy settings, and to obtain user consent to the privacy disclaimer and privacy settings. For example, the ED 110 may extract, from the GAS response frame, textual information for the privacy disclaimer and display this textual information to the user via a display screen of the ED 110. The ED 110 may also extract, from the GAS response frame, information about the privacy settings and convert this information to a format that can be displayed to the user (e.g., if the privacy settings are indicated by index values, the ED 110 may look up the index values in a privacy settings table to obtain textual information that can be displayed).

The ED 110 may also display a request to the user to provide input indicating acknowledgement or consent to the privacy disclaimer and settings. In some examples, if the ED 110 receives input indicating the user does not acknowledge or does not consent to the privacy disclaimer and settings, then the ED 110 may not continue with the signaling shown in FIG. 4A and may not associate with the AP 170. Alternatively, if the ED 110 receives input indicating the user does not acknowledge or does not consent to the privacy disclaimer and settings, the ED 110 may transmit a response (which may be in the form of a GAS comeback request frame, or other format) indicating non-consent. After the AP 170 receives an indication of non-consent from the ED 110 (or after the ED 110 fails to provide a response after expiry of the predefined waiting time duration), the AP 170 may reject any subsequent requests for association from the ED 110.

If the ED 110 receives input indicating the user consents to the privacy disclaimer and settings, then at 412 the ED 110 transmits a GAS comeback request frame to the AP 170 to indicate consent. In this example, the GAS comeback request frame contains a privacy acknowledgement field to indicate to the AP 170 that the ED 110 consents to the privacy disclaimer and settings of the AP 170. The privacy acknowledgement field may be identified by an order number (e.g., defined according to a standard) to enable the AP 170 to identify the privacy acknowledgement field in the frame body of the GAS comeback request frame. The presence of the privacy acknowledgement field in the GAS comeback request frame may be sufficient to indicate consent. In some examples, the privacy acknowledgement field may include a bit value (e.g., a binary value or binary flag) to indicate consent (e.g., a bit value of "1") or non-consent (e.g., a bit value of "0"). In such examples, the bit value carried in the privacy acknowledgement field may provide an option for the ED 110 to explicitly indicate non-consent to the AP 170, such that the AP 170 need not wait for expiry of the predefined waiting time duration.

Optionally, at 414, the AP 170 may transmit a GAS comeback response frame to the ED 110 to indicate receipt of the consent. In this example, the GAS comeback response frame contains a privacy acknowledgement receipt field, to indicate to the ED 110 that the privacy consent has been received by the AP 170. For example, the ED 110 may wait to receive the GAS comeback response frame with the privacy acknowledgement receipt field, before requesting association with the AP 170, to ensure that the association request will not be refused at the AP 170. If the ED 110 does not receive indication that the consent was received by the AP 170, the ED 110 may retransmit the GAS comeback request frame with privacy acknowledgement field. The privacy acknowledgement receipt field may be identified by an order number (e.g., defined according to a standard) to enable the ED 110 to identify the privacy acknowledgement receipt field in the frame body of the GAS comeback response frame. The presence of the privacy acknowledgement receipt field in the GAS comeback response frame may be sufficient to indicate receipt of the consent by the AP 170. In some examples, the privacy acknowledgement receipt field may include a default bit value (e.g., a bit value of "1").

After the AP 170 receives the GAS comeback request frame indicating consent from the ED 110 (and optionally after the ED 110 has received the GAS comeback response frame indicating receipt of consent from the AP 170), the AP 170 and ED 110 may perform operations to associate the ED 110 with the AP 170.

Figure 4B:
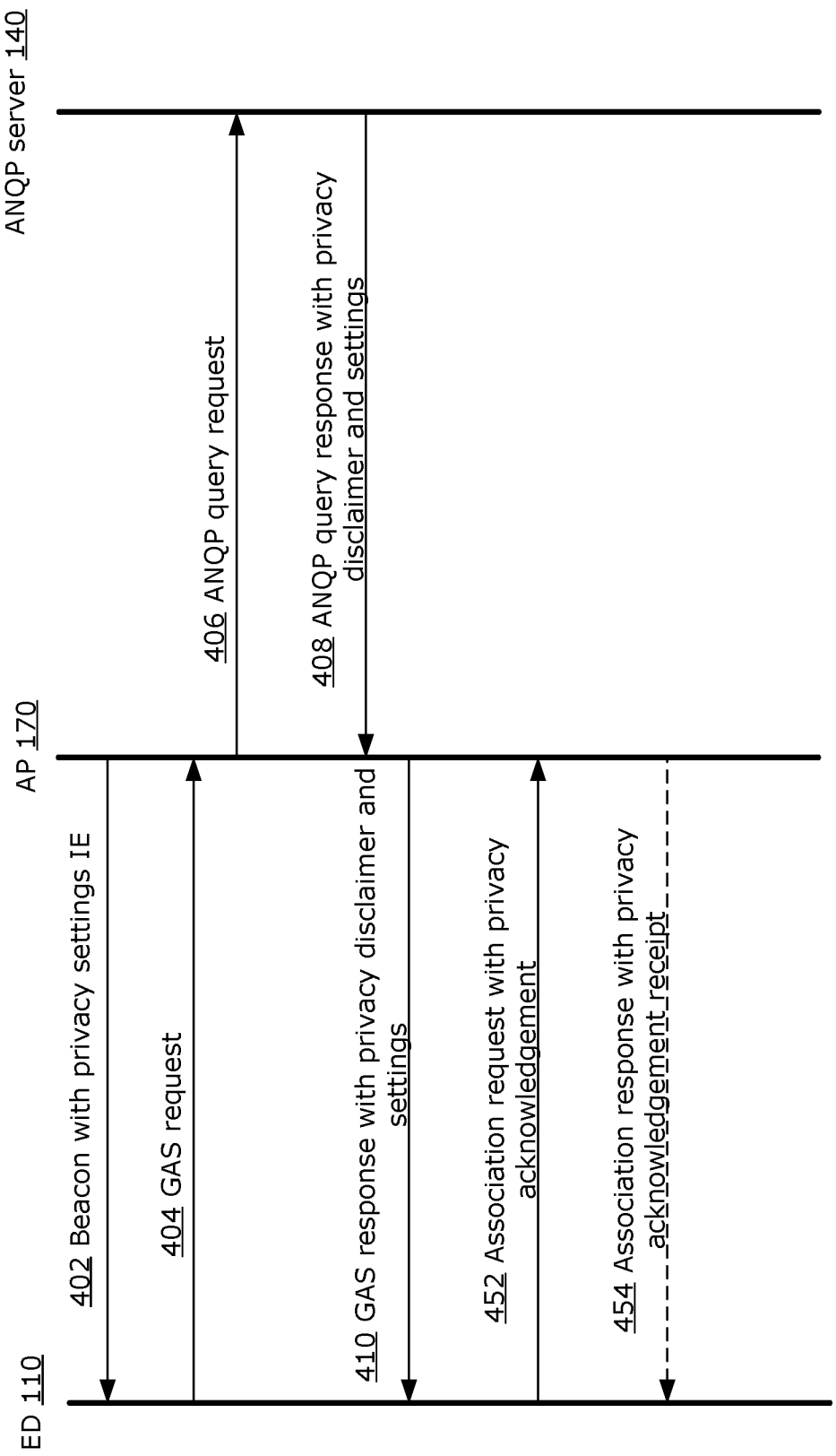

FIG. 4B is an example signal flow diagram illustrating another example of the signaling which may be used to implement some of the examples described herein. FIG. 4B shows signaling performed by the ED 110, the AP 170, and the ANQP server 140. The ANQP server 140 may, in some examples, be instead any other network server storing information associated with the AP's network. For example, the ANQP server 140 may be any suitable server or network entity belonging to the core network 130. In some examples, one or more of the signals shown may be communicated via one or more relay nodes. The following discussion focuses on details relevant to communication of privacy settings. However, the signaling shown in FIG. 4A may also be used as to communication other information that is regularly communicated using ANQP (e.g., information about network services). Some of the signaling shown in FIG. 4B is similar to the signaling shown in FIG. 4A (as indicated by having same reference numerals), and will not be discussed in detail here.

Details of FIG. 4B are discussed starting from the signal at 452, after the ED 110 has received the GAS response frame with privacy disclaimer and settings IE from the AP 170.

Similar to the discussion of FIG. 4A above, the ED 110 may perform operations to inform the user about the privacy disclaimer and privacy settings, and to obtain user consent to the privacy disclaimer and privacy settings. The ED 110 may also display a request to the user to provide input indicating acknowledgement or consent to the privacy disclaimer and settings. In some examples, if the ED 110 receives input indicating the user does not acknowledge or does not consent to the privacy disclaimer and settings, then the ED 110 may not continue with the signaling shown in FIG. 4B and may not associate with the AP 170.

If the ED 110 receives input indicating the user consents to the privacy disclaimer and settings, then the ED 110 may proceed to attempt association with the AP 170. The input received by the ED 110 may be an explicit indication of consent (e.g., the user selects an option to "agree" to the privacy disclaimer and settings) or may be an implicit indication of consent (e.g., the user instructs the ED 110 to proceed with association). At 452, the ED 110 transmits an association request frame to the AP 170. In this example, the association request frame contains a privacy acknowledgement field to indicate to the AP 170 that the ED 110 consents to the privacy disclaimer and settings of the AP 170. Unlike the example of FIG. 4A, the ED 110 indicates consent to the AP 170 as part of requesting association, instead of using a separate communication (e.g., the GAS comeback request frame) prior to requesting association. This may help to reduce the signaling by the ED 110 (and associated latency) required to indicate consent and request association. The privacy acknowledgement field in the association request frame may be similar to that described above with respect to FIG. 4A. The AP 170 may inspect the associate request frame to ensure that the privacy acknowledgement field indicates consent from the ED 110, before proceeding with association.

Optionally, at 454, the AP 170 may transmit an association response frame to the ED 110 to indicate receipt of the associate request and consent. In this example, the association response frame contains a privacy acknowledgement receipt field (similar to that described above with respect to FIG. 4A), to indicate to the ED 110 that the privacy consent has been received by the AP 170.

The ED 110 and AP 170 may then continue with operations to associate the ED 110 with the AP 170.

FIG. 5 illustrates an example of a privacy settings IE 500, which may be included in the beacon frame (or probe response frame) transmitted by the AP 170 (e.g., at 402). The privacy settings IE 500 may be adapted from the GAS queries IE defined in IEEE 802.11u, and thus the privacy settings IE 500 may also be referred to as a GAS queries and with privacy IE. The privacy settings IE 500 may be identified by an order number and name (e.g., defined according to a standard) enable a receiving device (e.g., the ED 110) to recognize the privacy settings IE 500 and to correctly parse the information contained in the privacy settings IE 500.

In the example shown in FIG. 5, the privacy settings IE 500 includes an element identifier (ID) field 502 that is one octet long, a length field 504 that is one octet long, and a privacy settings field 506 that is one octet long. The element ID field 502 identifies the IE as a privacy settings IE 500 (e.g., contains the order number defined in the standard), the length field 504 indicates the overall length of the privacy settings IE 500, and the privacy settings field 506 includes a most significant bit (MSB) 508 that is set to a value P (other bits in the privacy settings field 506 may be reserved). The value P of the MSB 508 is set to "1" to indicate that the AP 170 and associated LAN 120 supports communication of privacy settings and disclaimer, and set to "0" to indicate that the AP 170 and associated LAN 120 does not support communication of privacy settings and disclaimer.

If the ED 110 receives, from the AP 170, a beam frame (or probe response frame) containing the privacy settings IE 500 with the MSB 508 set to "1", the ED 110 may proceed with the signaling discussed above to obtain information about privacy settings and disclaimer at the AP 170. Otherwise, the ED 110 may perform conventional ANQP signaling.

FIG. 6 illustrates an example of a privacy disclaimer and settings IE 600, which may be included in the ANQP query response frame transmitted by the ANQP server 140 (e.g., at 408) and in the GAS response frame transmitted by the AP 170 (e.g., at 410). The privacy disclaimer and settings IE 600 may be identified by an ANQP element name and ID number (e.g., defined according to a standard) to enable a receiving device to identify the privacy disclaimer and settings IE 600.

In the example shown in FIG. 6, the privacy disclaimer and settings IE 600 includes an element identifier (ID) field 602 that is two octet long, a length field 604 that is two octet long, a privacy disclaimer field 606 that has variable length, and a privacy settings field 608 that has variable length. The element ID field 602 identifies the IE as a privacy disclaimer and settings IE 600 (e.g., contains the ID number defined in the standard) and the length field 604 indicates the overall length of the privacy disclaimer and settings IE 600. The privacy disclaimer field 606 contains the information, such as textual information in the form of text strings, for the privacy disclaimer. The privacy disclaimer field 606 may be as long as needed to hold the privacy disclaimer information. The privacy settings field 608 contains information indicating the privacy settings, which may be in a format defined according to a standard. For example, the privacy settings field 608 may contain textual information in the form of strings that describes the privacy settings (e.g., how data collection, storing and sharing is performed) in text that may be displayed to a user via the ED 110. In another example, the privacy settings field 608 may contain one or more index values that may be used by the ED 110 to identify the privacy settings at the AP 170 by looking up a reference table (which may be preconfigured at the ED 110) containing possible different privacy settings. The privacy settings field 608 may be as long as needed to hold the privacy settings information. The privacy settings field 608 may be optional. For example, the privacy settings information may be included as textual information as part of the privacy disclaimer. In such cases, the privacy settings field 608 may be set to "NULL" or may be omitted from the privacy disclaimer and settings IE 600.

As described above, the ED 110 is configured to extract the privacy disclaimer information and the privacy settings information from the privacy disclaimer and settings IE 600. The ED 110 is configured to convert the extracted information into a text format, if necessary (e.g., if the privacy settings information is contained in the privacy disclaimer and settings IE 600 as index values), to enable the information to be displayed to a user.

Figure 7:
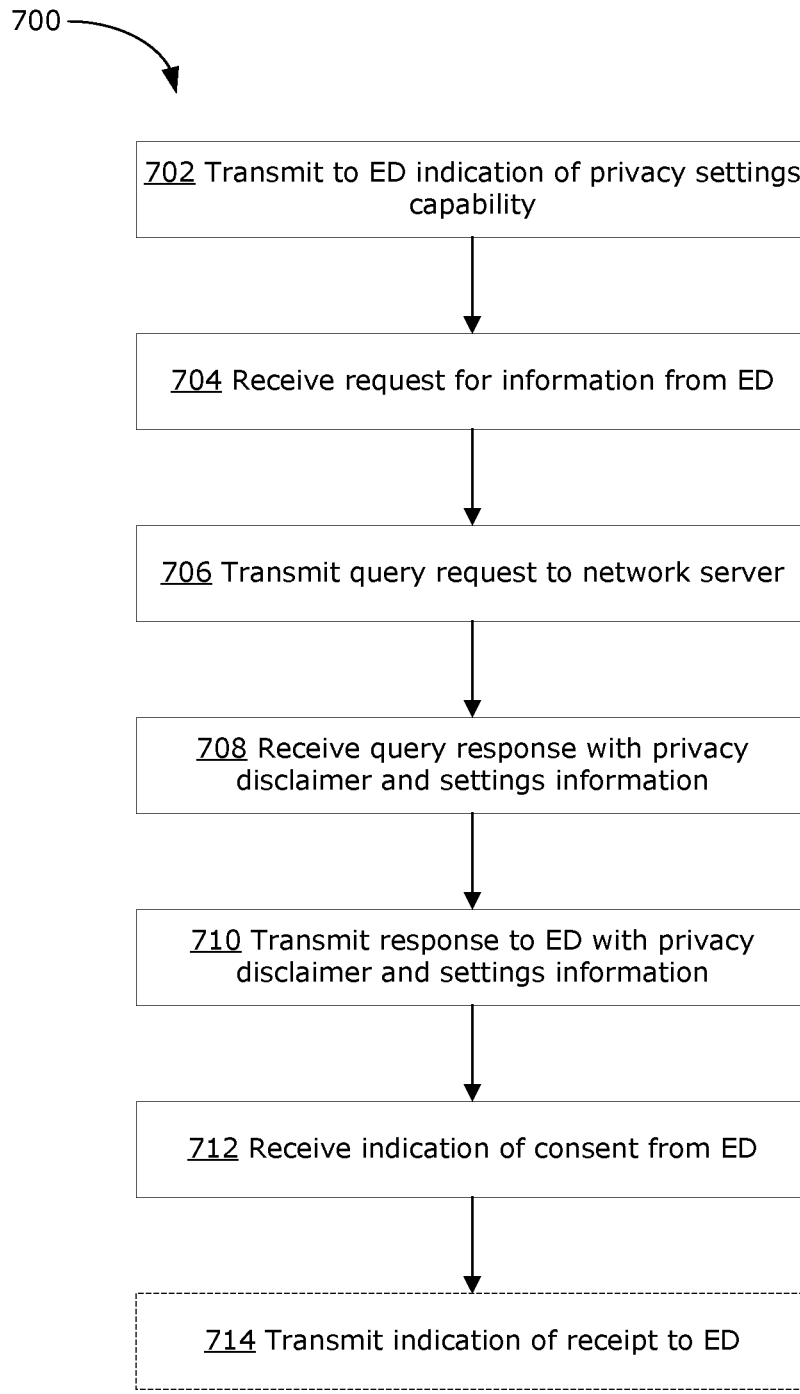
FIG. 7 is a flowchart illustrating an example method that may be performed by an AP in the examples of FIGS. 4A and 4B.

FIG. 7 is a flowchart illustrating an example method 700 that may be performed by the AP 170, as shown in the signaling diagrams of FIGS. 4A and 4B. The method 700 may be encoded as instructions, which may be stored in a memory of the AP 170. Execution of the instructions by a processing unit of the AP 170 causes the AP 170 to perform the method 700.

At 702, the AP 170 transmits to the ED 110 an indication that the AP 170 has privacy settings capability (i.e., that the AP 170 supports a procedure for communication of privacy settings and disclaimer), as described above. For example, the AP 170 may transmit a beacon frame (e.g., at 402 in FIGS. 4A and 4B) or a probe response frame (e.g., in response to a probe request from the ED 110) containing the privacy settings IE 600.

At 704, the AP 170 receives from the ED 110 a request for information about the privacy settings and disclaimer (and possibly other network services) at the AP 170. For example, the AP 170 may receive the request in a GAS request frame (e.g., at 404 in FIGS. 4A and 4B).

At 706, the AP 170 transmits to a network server (e.g., the ANQP server 140) a query request for information about the privacy settings and disclaimer at the AP 170. For example, the AP 170 may transmit to the ANQP server 140 an ANQP query request frame (e.g., at 406 in FIGS. 4A and 4B).

At 708, the AP 170 receives from the network server (e.g., the ANQP server 140) a query response containing information about privacy disclaimer and settings at the AP 170. For example, the AP 170 may receive from the ANQP server 140 an ANQP query response frame (e.g., at 408 in FIGS. 4A and 4B). For example, the ANQP query response frame contains the privacy disclaimer and settings IE 700.

At 710, the AP 170 transmits to the ED 110 a response containing information about privacy disclaimer and settings (which the AP 170 received from the ANQP server 140). For example, the AP 170 may transmit to the ED 110 a GAS response frame (e.g., at 410 in FIGS. 4A and 4B). For example, the GAS response frame contains the privacy disclaimer and settings IE 700 (e.g., the AP 170 may reframe the ANQP query response frame into the GAS response frame).

At 712, the AP 170 receives from the ED 110 an indication that the ED 110 consents to the privacy disclaimer and settings. For example, the AP 170 may receive a GAS comeback request frame with a privacy acknowledgement field (e.g., at 412 in FIG. 4A) or may receive an association request frame with a privacy acknowledgement field (e.g., at 452 in FIG. 4B). The AP 170 is configured to detect the privacy acknowledgement field and to recognize this as an indication of consent from the ED 110.

Optionally, at 714, the AP 170 transmits to the ED 110 an indication of receipt of the consent. The receipt may be transmitted in a frame format dependent on the frame format used by the ED 110 to transmit the consent. For example, if the AP 170 received indication of consent in a GAS comeback request frame, then the AP 170 may transmit indication of receipt in the form of a GAS comeback response frame with a privacy acknowledgement receipt field (e.g., at 414 in FIG. 4A). If the AP 170 received indication of consent in an association request frame, then the AP 170 may transmit indication of receipt in the form of an association response frame with a privacy acknowledgement receipt field (e.g., at 454 in FIG. 4B).

The AP 170 may continue to perform further operations to associate the ED 110 with the AP 170.

Figure 8:
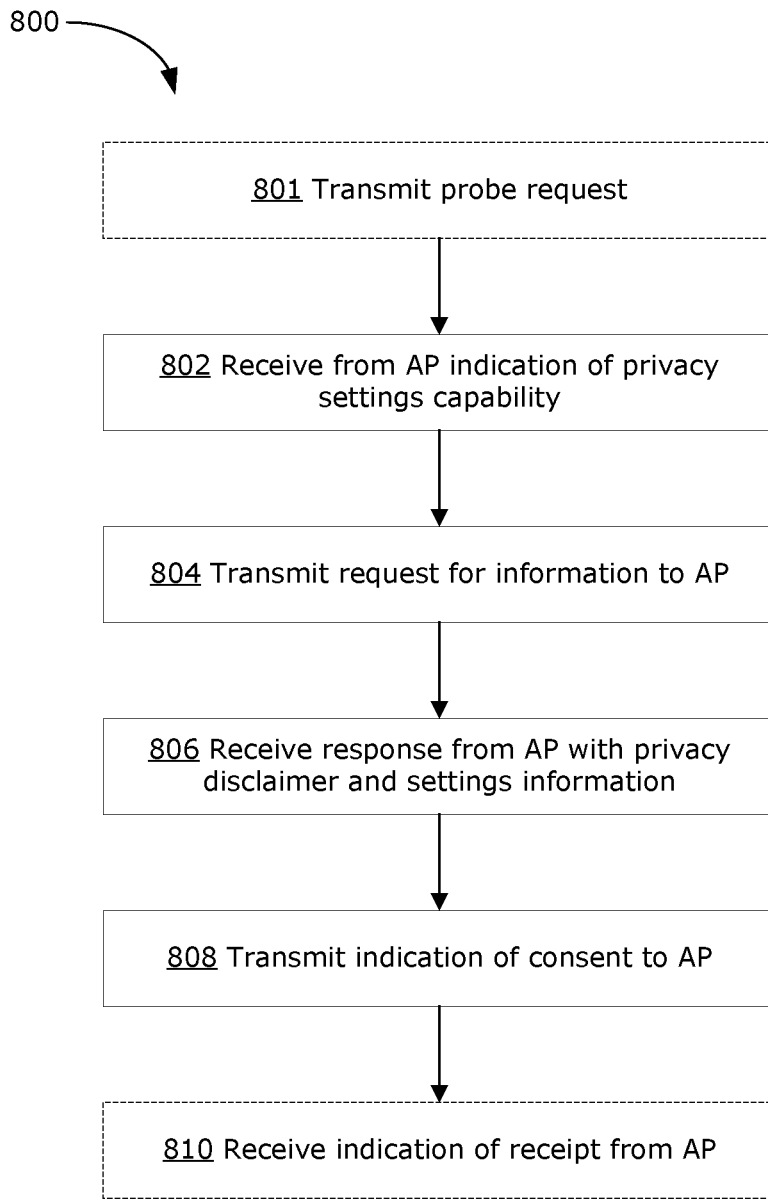
FIG. 8 is a flowchart illustrating an example method that may be performed by an ED in the examples of FIGS. 4A and 4B.

FIG. 8 is a flowchart illustrating an example method 800 that may be performed by the ED 110, as shown in the signaling diagrams of FIGS. 4A and 4B. The method 800 may be encoded as instructions, which may be stored in a memory of the ED 110. Execution of the instructions by a processing unit of the ED 110 causes the AP 170 to perform the method 800.

Optionally, at 801, the ED 110 may transmit a probe request frame (e.g., over a broadcast channel) to request information from the AP 170.

At 802, the ED 110 receives from the AP 170 an indication that the AP 170 has privacy settings capability (i.e., that the AP 170 supports a procedure for communication of privacy settings and disclaimer), as described above. For example, the ED 110 may receive a beacon frame (e.g., at 402 in FIGS. 4A and 4B) or a probe response frame (if a probe request frame was transmitted at optional step 801) containing the privacy settings IE 600.

At 804, the ED 110 transmits to the AP 170 a request for information about the privacy settings and disclaimer (and possibly other network services) at the AP 170. For example, the ED 110 transmits to the AP 170 a GAS request frame (e.g., at 404 in FIGS. 4A and 4B).

At 806, the ED 110 receives from the AP 170 a response containing information about privacy disclaimer and settings. For example, the ED 110 receives from the AP 170 a GAS response frame (e.g., at 410 in FIGS. 4A and 4B). For example, the GAS response frame contains the privacy disclaimer and settings IE 700.

The ED 110 may extract the privacy disclaimer and settings information from the received response (e.g., extract the information from the relevant fields in the privacy disclaimer and settings IE 700), and output this information to a user (e.g., as displayed text). The ED 110 may further request the user provide consent to the privacy disclaimer and settings of the AP 170, and in response receive input indicating consent. Alternatively, the ED 110 may, after outputting this information, receive input to proceed with association with the AP 170, which may be considered an indication of implicit consent.

At 808, after the ED 110 receives input indicating consent (either explicit or implicit consent) to the privacy disclaimer and settings of the AP 170, the ED 110 transmits to the AP 170 an indication that the ED 110 consents to the privacy disclaimer and settings. For example, the ED 110 may transmit a GAS comeback request frame with a privacy acknowledgement field (e.g., at 412 in FIG. 4A) or may receive an association request frame with a privacy acknowledgement field (e.g., at 452 in FIG. 4B).

Optionally, at 810, the ED 110 receives from the AP 170 an indication of receipt of the consent. The receipt may be received in a frame format dependent on the frame format used by the ED 110 to transmit the consent. For example, if the ED 110 transmitted indication of consent in a GAS comeback request frame, then the ED 110 may receive indication of receipt in the form of a GAS comeback response frame with a privacy acknowledgement receipt field (e.g., at 414 in FIG. 4A). If the ED 110 transmitted indication of consent in an association request frame, then the ED 110 may receive indication of receipt in the form of an association response frame with a privacy acknowledgement receipt field (e.g., at 454 in FIG. 4B). The ED 110 may be configured to detect the privacy acknowledgement receipt field and to recognize this as an indication of receipt of consent.

The ED 110 may continue to perform further operations to associate with the AP 170.

In various examples, the present disclosure describes methods and apparatuses that help to ensure data privacy. A mechanism is described to enable the ED to recognize that the AP supports privacy settings capabilities, and to obtain information about the privacy settings and disclaimer at the AP. In particular, examples described herein enable an ED to be informed of privacy settings and privacy disclaimer at an AP, prior to association.

In some examples, an ED may provide explicit consent to the AP's privacy settings and disclaimer. In other samples, consent may be provided implicitly (e.g., as part of an association request from the ED).

The examples disclosed herein may enable the AP's operator to comply with regulations on data privacy.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method at an access point (AP), the method comprising:
 transmitting an indication that the AP supports communication of privacy settings and privacy disclaimer associated with the AP;

receiving, from an electronic device (ED), a request for information about the privacy settings and privacy disclaimer associated with the AP;

transmitting, to a network server, a query request for information about the privacy settings and privacy disclaimer associated with the AP;

receiving, from the network server, a query response including information about the privacy settings and privacy disclaimer associated with the AP; and transmitting, to the ED, a response including information about the privacy settings and privacy disclaimer associated with the AP;

wherein the AP requires user consent to the privacy settings and privacy disclaimer from a user associated with the ED, the user consent being required to enable association of the ED with the AP.

2. The method of claim 1, further comprising:

receiving, from the ED, a probe request frame;

wherein the indication that the AP supports communication of privacy settings and privacy disclaimer associated with the AP is transmitted in a probe response frame.

3. The method of claim 1, wherein the indication that the AP supports communication of privacy settings and privacy disclaimer associated with the AP is transmitted in a broadcast beacon frame.

4. The method of claim 1, wherein the indication that the AP supports communication of privacy settings and privacy disclaimer associated with the AP is transmitted in a frame having a frame body, the frame body including a privacy settings information element (IE), the privacy settings IE having a bit value that is set to indicate support of communication of privacy settings and privacy disclaimer.

5. The method of claim 1, wherein the request for information is received from the ED in a generic advertisement service (GAS) request frame, and wherein the response transmitted to the ED is in a GAS response frame.

6. The method of claim 5, wherein the query response is transmitted to the network server in an access network query protocol (ANQP) query request frame, and the query response received from the network server is in an ANQP query response frame.

7. The method of claim 6, wherein the ANQP query response frame includes, in a frame body of the ANQP query response frame, a privacy disclaimer and settings information element (IE), the privacy disclaimer and settings IE including a privacy disclaimer field containing information about the privacy disclaimer associated with the AP, and a privacy settings field containing information about the privacy settings associated with the AP, and wherein the GAS response frame includes, in a frame body of the GAS response frame, the privacy disclaimer and settings IE.

8. The method of claim 1, further comprising:

receiving, from the ED, an indication that the user consents to the privacy settings and privacy disclaimer associated with the AP.

9. The method of claim 8, wherein the indication is received from the ED in a generic advertisement service (GAS) comeback request frame, the GAS comeback request frame including a privacy acknowledgement field, and wherein the AP is configured to detect the privacy acknowledgement field as the indication that the user consents.

10. The method of claim 8, wherein the indication is received from the ED in an association request frame, the association request frame including a privacy acknowledgement field, and wherein the AP is configured to detect the privacy acknowledgement field as the indication that the user consents.

11. The method of claim 8, further comprising:

transmitting, to the ED, an indication of receipt of the user consent.

12. An access point (AP) comprising:

a processor coupled to a memory, the memory storing instructions that, when executed by the processor, cause the AP to:

transmit an indication that the AP supports communication of privacy settings and privacy disclaimer associated with the AP;

receive, from an electronic device (ED), a request for information about the privacy settings and privacy disclaimer associated with the AP;

transmit, to a network server, a query request for information about the privacy settings and privacy disclaimer associated with the AP;

receive, from the network server, a query response including information about the privacy settings and privacy disclaimer associated with the AP; and transmit, to the ED, a response including information about the privacy settings and privacy disclaimer associated with the AP;

wherein the AP requires user consent to the privacy settings and privacy disclaimer from a user associated with the ED, the user consent being required to enable association of the ED with the AP.

13. A method at an electronic device (ED), the method comprising:

receiving, from an access point (AP), an indication that the AP supports communication of privacy settings and privacy disclaimer associated with the AP;

transmitting, to the AP, a request for information about the privacy settings and privacy disclaimer associated with the AP; and receiving, from the AP, a response including information about the privacy settings and privacy disclaimer associated with the AP;

wherein user consent to the privacy settings and privacy disclaimer is required, from a user associated with the ED, to enable association of the ED with the AP.

14. The method of claim 13, wherein the indication that the AP supports communication of privacy settings and privacy disclaimer associated with the AP is received in a frame having a frame body, the frame body including a privacy settings information element (IE), the privacy settings IE having a bit value that is set to indicate support of communication of privacy settings and privacy disclaimer.

15. The method of claim 13, wherein the request for information is transmitted to the AP in a generic advertisement service (GAS) request frame, and wherein the response received from the AP is in a GAS response frame.

16. The method of claim 15, wherein the GAS response frame includes, in a frame body of the GAS response frame, a privacy disclaimer and settings information element (IE), the privacy disclaimer and settings IE including a privacy disclaimer field containing information about the privacy disclaimer associated with the AP, and a privacy settings field containing information about the privacy settings associated with the AP.

17. The method of claim 13, further comprising:

transmitting, to the AP, an indication that the user consents to the privacy settings and privacy disclaimer associated with the AP.

18. The method of claim 17, wherein the indication is transmitted to the AP in a generic advertisement service (GAS) comeback request frame, the GAS comeback request frame including a privacy acknowledgement field, the privacy acknowledgement field being detectable as the indication that the user consents.

19. The method of claim 17, wherein the indication is transmitted to the AP in an association request frame, the association request frame including a privacy acknowledgement field, the privacy acknowledgement field being detectable as the indication that the user consents.

20. The method of claim 13, further comprising:
transmitting, to the AP, a probe request frame;
wherein the indication that the AP supports communication of privacy settings and privacy disclaimer associated with the AP is received in a probe response frame.

21. The method of claim 1, wherein the privacy settings and privacy disclaimer include information about what user data is being collected, how the user data is stored or how the user data is used.

* * * * *